US008823848B2

(12) United States Patent
Chipman et al.

(10) Patent No.: US 8,823,848 B2
(45) Date of Patent: Sep. 2, 2014

(54) MICROGRID IMAGING POLARIMETERS WITH FREQUENCY DOMAIN RECONSTRUCTION

(75) Inventors: Russell A. Chipman, Tucson, AZ (US); Stanley Pau, Tucson, AZ (US); J. Scott Tyo, Tucson, AZ (US); Bradley M. Ratliff, Union, OH (US)

(73) Assignee: The Arizona Board of Regents on behalf of the University of Arizona, Tucson, AZ (US)

( * ) Notice: Subject to any disclaimer, the term of this patent is extended or adjusted under 35 U.S.C. 154(b) by 269 days.

(21) Appl. No.: 13/377,518

(22) PCT Filed: Jun. 11, 2010

(86) PCT No.: PCT/US2010/038412
§ 371 (c)(1),
(2), (4) Date: Dec. 9, 2011

(87) PCT Pub. No.: WO2010/144866
PCT Pub. Date: Dec. 16, 2010

(65) Prior Publication Data
US 2012/0075513 A1    Mar. 29, 2012

Related U.S. Application Data

(60) Provisional application No. 61/268,309, filed on Jun. 11, 2009, provisional application No. 61/278,352, filed on Oct. 6, 2009.

(51) Int. Cl.
| | | |
|---|---|---|
| H04N 5/335 | (2011.01) | |
| H04N 5/228 | (2006.01) | |
| H04N 5/225 | (2006.01) | |
| G02B 5/30 | (2006.01) | |

(52) U.S. Cl.
USPC ........ 348/302; 348/208.2; 348/340; 359/437; 359/485.01

(58) Field of Classification Search
None
See application file for complete search history.

(56) References Cited

U.S. PATENT DOCUMENTS

| | | | |
|---|---|---|---|
| 6,233,009 | B1 | 5/2001 | Morofuji et al. |
| 7,582,857 | B2 | 9/2009 | Gruev et al. |
| 7,609,950 | B2 | 10/2009 | Washisu |
| 7,719,684 | B2 | 5/2010 | Mattox et al. |
| 2005/0062966 | A1 | 3/2005 | Chen et al. |
| 2007/0241267 | A1 | 10/2007 | Gruev et al. |

(Continued)

OTHER PUBLICATIONS

International Search Report and Written Opinion for PCT/US2010/038412, dated Aug. 18, 2010, 16 pages.

(Continued)

Primary Examiner — Lin Ye
Assistant Examiner — John H Morehead, III
(74) Attorney, Agent, or Firm — Klarquist Sparkman, LLP

(57) ABSTRACT

A polarization camera includes a microelement polarizer that is situated in proximity to a focal plane array. The microelement polarizer is selectively scanned with respect to an optical image direct to the focal plane array, and an image processor stores a set of images associated with the scanning. Based on the stored images, a polarization image can be produced and displayed. A periodic microelement polarizer modulates the individual images of the set, and these images can be processed by filtering in the spatial frequency domain to isolate contributions associated with one or a combination of Stokes parameters. After filtering, Stokes parameter based images can be obtained by demodulating and inverse Fourier transforming the filtered frequency domain data.

21 Claims, 9 Drawing Sheets

(56) References Cited

U.S. PATENT DOCUMENTS

| | | | |
|---|---|---|---|
| 2008/0136924 A1* | 6/2008 | Washisu | 348/208.2 |
| 2008/0165359 A1* | 7/2008 | Mattox et al. | 356/367 |
| 2009/0141027 A1* | 6/2009 | Sato et al. | 345/426 |
| 2010/0283885 A1* | 11/2010 | Lin et al. | 348/340 |
| 2012/0236165 A1* | 9/2012 | Molgaard | 348/208.1 |
| 2013/0039600 A1* | 2/2013 | Mattox | 382/284 |
| 2013/0271946 A1* | 10/2013 | Dogariu et al. | 362/19 |

OTHER PUBLICATIONS

Hardie et al., "High-Resolution Image Reconstruction from a Sequence of Rotated and Translated Frames and its Application to an Infrared Imaging System," Optical Engineering 37(1):247-260, (Apr. 1997).

Kim et al., "Imaging Multispectral Polarimetric Sensor: Single-Pixel Design, Fabrication, and Characterization," 42(19):3756-3764, (Jul. 1, 2003).

Tyo et al., "Review of Passive Imaging Polarimetry for Remote Sensing Applications," Applied Optics 45(22):5453-5469, (Aug. 1, 2006).

Tyo et al., "Total Elimination of Sampling Errors in Polarization Imagery Obtained with Integrated Microgrid Polarimeters," Optical Society of America 34(20):3187-3189, (Oct. 15, 2009).

Ratliff et al., "Interpolation Strategies for Reducing IFOV Artifacts in Microgrid Polarimeter Imagery," Optics Express 17(11):9112-9125 (May 25, 2009).

* cited by examiner

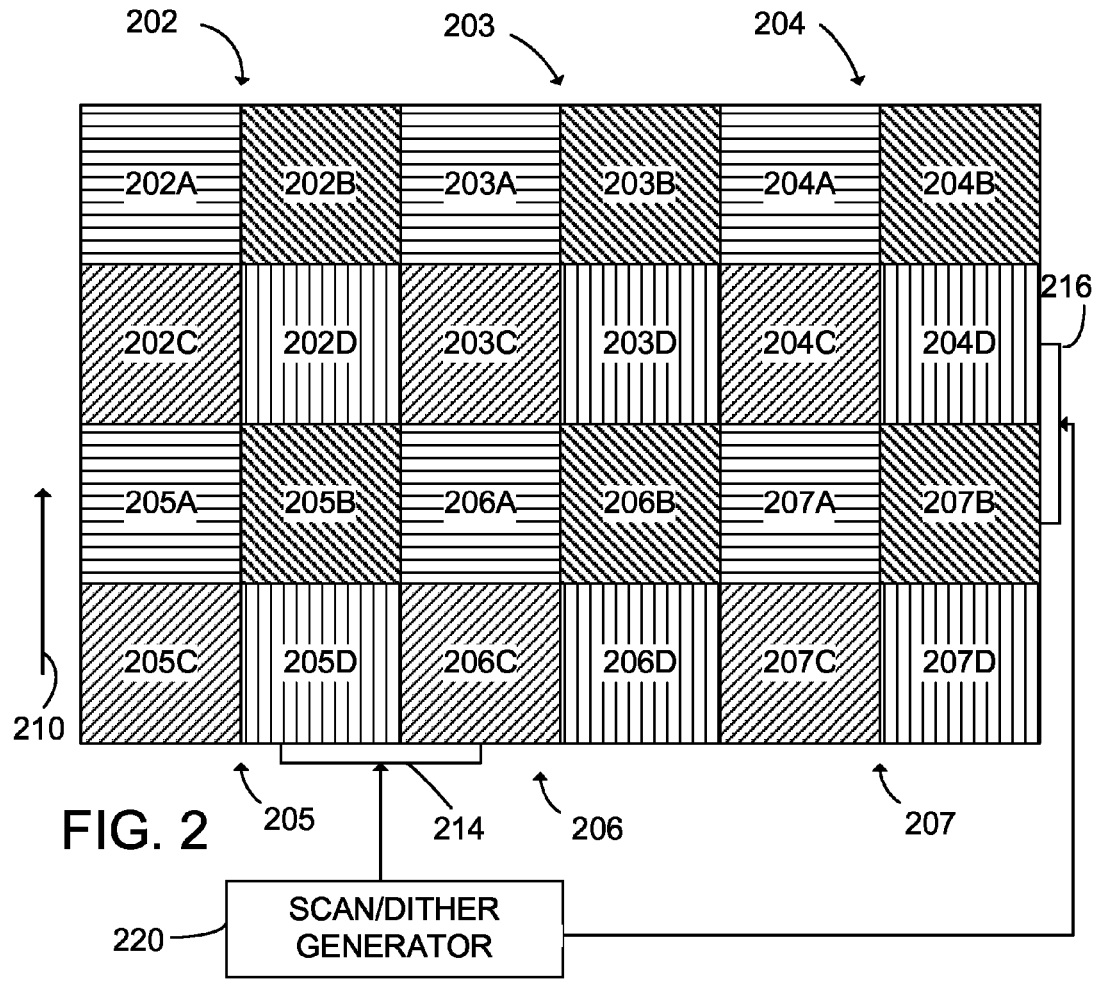
FIG. 2
FIG. 3A
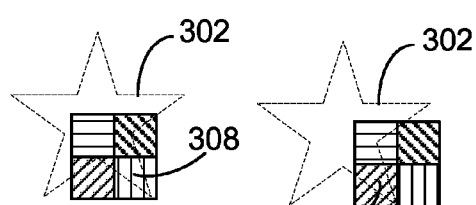
FIG. 3B
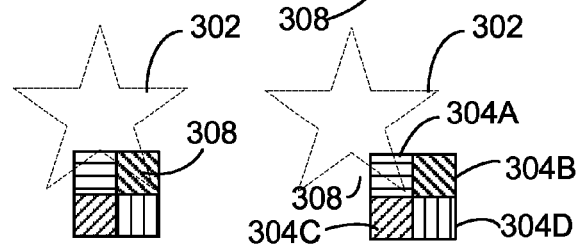
FIG. 3C
FIG. 3D

| η= -0.5 | | |
|---|---|---|
| $\hat{S}_0 + \frac{1}{2}(\hat{S}_2 - \hat{S}_3)$<br><br>755 | $\hat{S}_1 - \frac{1}{2}(\hat{S}_2 - \hat{S}_3)$<br>754 | $\hat{S}_0 + \frac{1}{2}(\hat{S}_2 - \hat{S}_3)$<br><br>755 |
| $\hat{S}_2 + \hat{S}_3$<br><br>η= 0<br>752 | $\hat{S}_0 + \frac{1}{4}(\hat{S}_2 + \hat{S}_3)$<br>751 | $\hat{S}_2 + \hat{S}_3$<br><br>752 |
| $\hat{S}_0 + \frac{1}{2}(\hat{S}_2 - \hat{S}_3)$<br><br>755 | $\hat{S}_1 - \frac{1}{2}(\hat{S}_2 - \hat{S}_3)$<br>754 | $\hat{S}_0 + \frac{1}{2}(\hat{S}_2 - \hat{S}_3)$<br><br>755 |
| η= 0.5<br>ξ=-0.5 | ξ=0 | ξ=0.5 |

MICROGRID IMAGING POLARIMETERS WITH FREQUENCY DOMAIN RECONSTRUCTION

CROSS-REFERENCE TO RELATED APPLICATIONS

This application is U.S. National Stage of PCT Application No. PCT/US2010/038412, filed Jun. 11, 2010, and claims the benefit of U.S. Provisional Application Nos. 61/278,352, filed Oct. 6, 2009 and 61/268,309, filed Jun. 11, 2009, all of which are incorporated herein by reference.

STATEMENT REGARDING GOVERNMENT RIGHTS

This invention was made with government support under Awards FA9550-07-1-0087 and FA9550-08-1-0295 awarded by the U.S. Air Force Office of Scientific Research. The government has certain rights in the invention.

FIELD

The disclosure pertains to imaging polarimetry.

BACKGROUND

The evaluation of the state of polarization of light received from an object has many applications. For example, polarization based analysis provides information on the orientation in space of chemical bonds, surface orientation, refractive index, texture (including orientation of surface texture), and roughness. Polarization can be used in applications such as the visualization of mechanical stresses and the evaluation of products ranging from surface coatings to liquid crystal displays. Other applications include haze and glare reduction in photography, as well as deepening the apparent color of the sky.

The determination of the state of polarization of an optical beam or other optical signal typically requires two or more measurements. For example, the state of polarization of a partially polarized optical beam can be determined with three polarization based measurements along with measurement of total beam intensity. This series of measurements must be carefully executed to avoid inducing polarization changes in the optical beam. Measurement systems that implement such measurements, perform data reduction, and report Stokes vectors, Mueller matrices, Jones vectors, or other polarization parameters are generally referred to as polarimeters. Polarimeters commonly incorporate motors and/or beamsplitters, and tend to be bulky and expensive.

So-called "imaging polarimeters" can provide images based on the state of polarization of an optical flux received from an object being imaged. Imaging polarimetry faces the many of the same difficulties as non-imaging polarimetry as well as additional problems. For example, the acquisition of multiple polarizer measurements for each image pixel can be slow, and object motion or changes in object illumination can impair image accuracy or introduce image blur. In one approach to imaging polarimetry, an array of micropolarizers is situated near a focal plane array so that each pixel of the focal plane array receives an optical flux associated with a state of polarization defined by one of the micropolarizers. Examples of such systems are described in Gruev et al., U.S. Patent Application Publication 2007/0241267 and Mattox et al., U.S. Patent Application Publication 2008/0165359, both of which are incorporated herein by reference. Signals from several pixels of the focal plane array can then be combined. Unfortunately, conventional approaches to combining these signals not only reduce image resolution but mix polarization measurements from different object locations. Thus, a lower resolution image with polarization artifacts is produced.

SUMMARY

Polarization cameras include an image sensor having a plurality of sensor pixels configured to produce image data based on an optical image formed at the image sensor. A micropolarizer array comprising a plurality of micropolarizer elements corresponding to the sensor pixels is situated at the image sensor so as to receive the optical image and direct a micropolarizer processed (or micropolarizer modulated) optical image to the image sensor. A scanner is configured to produce a relative displacement of the micropolarizer array with respect to the optical image. An image processor receives image data from the image sensor and produces a polarization image based on image data associated with at least two relative displacements of the micropolarizer and the optical image. In some examples, the scanner is configured to produce the relative displacement by displacing the micropolarizer array. In other examples, the camera comprises a lens situated to form the image, wherein the scanner produces the relative displacement by displacing at least an element of the lens.

In additional embodiments, each of the sensor pixels of the image sensor includes at least two pixels associated with image color components, and the micropolarizer array includes microarray elements corresponding to the pixels associated with the image color components. In other examples, the micropolarizer array is fixed with respect to the image sensor. In still further embodiments, the scanner is coupled to at least one sensor and is configured to produce a relative displacement of the image sensor and the image so as to at least partially compensate camera movement. In further examples, the camera includes an actuator coupled to the scanner and configured to displace the micropolarizer array and the image sensor with respect to the optical image. Typically, the micropolarizer array is fixed with respect to the image sensor. In representative examples, the polarization image corresponds to a degree of linear polarization, a degree of circular polarization, an angle of polarization, a degree of polarization, an ellipticity, a Stokes parameter $s_1$, a Stokes parameter $s_2$, or a Stokes parameter $s_3$ of the optical image.

Cameras comprise an image sensor having a plurality of sensor pixels and configured to produce image data based on an optical image formed at the image sensor. A micropolarizer array comprising a plurality of micropolarizer elements corresponding to the sensor pixels is situated at the image sensor so as to receive the optical image and direct a micropolarizer modulated optical image to the image sensor. An image stabilization system is configured to produce a relative displacement of the image sensor with respect to the optical image so as to compensate camera movement, wherein the image stabilization system is further configured to produce a relative displacement of the image with respect to the elements of the micropolarizer array. An image processor is configured to receive image data from the image sensor and produce a polarization image based on image data associated with at least two relative displacements of the micropolarizer array and the optical image.

Methods comprise directing an optical image to a polarizer array situated at an image sensor and producing at least two relative displacements of the polarizer array and the optical image such that image portions are substantially received at different polarizer array elements. Image data associated with the at least two relative displacements are acquired, and a polarization image is determined based on the acquired image data. In some examples, the methods comprise producing at least one polarization image associated with a common state of polarization at the image sensor. In typical examples, the polarization image is associated with a degree of linear polarization, a degree of circular polarization, an angle of polarization, a degree of polarization, or a Stokes parameter $s_1$, $s_2$, or $s_3$.

In other examples, methods comprise receiving a stored image associated with a polarizer array that is configured to apply a periodic polarization-dependent intensity modulation to a received irradiance distribution. In the analysis, the stored image is spatially Fourier transformed, and at least one spatial frequency domain filter is applied to the Fourier transformed image. The filtered Fourier transformed image is demodulated, inverse Fourier transformed, and a polarization image associated with at least one of a degree of linear polarization, a degree of circular polarization, an angle of polarization, a degree of polarization, a Stokes parameter $s_0$, a Stokes parameter $s_1$, a Stokes parameter $s_2$, or a Stokes parameter $s_3$ is produced based on the inverse transform. In some examples, the filter is a low pass filter and the polarization image is associated with the Stokes parameter a combination of one or more of the Stokes parameters. In one example, the polarization image is associated with $s_0$. In other examples, the filter is a high pass filter, and the polarization image is associated with a combination of one or more of the Stokes parameters. In one example, the polarization image is associated with the Stokes parameter $s_1$ and the Stokes parameter $s_2$. In additional examples, the stored image is based on a periodic polarization analysis corresponding to a micropolarizer array having rows that alternate horizontal and 45 degree linear polarizers with rows that alternate −45 degree and vertical linear polarizers, and the polarization image is associated with a sum or a difference of the Stokes parameters $s_1$ and $s_2$. In typical examples, the stored image is a two dimensional image, at least one high pass filter is applied to spatial frequencies in two directions, and polarization images associated with combinations of one or more of the Stokes parameters, such as a sum and difference of the Stokes parameters $s_1$ and $s_z$ are produced. In further examples, at least one spatial frequency domain filter is selected based on a spatial Fourier transform associated with the polarizer array. In particular examples, the spatial Fourier transform of the polarizer array is based on a periodic analyzer Stokes vector associated with the polarizer array.

These and other features and aspects of the disclosed technology are set forth below with reference to the accompanying drawings.

BRIEF DESCRIPTION OF THE DRAWINGS

FIG. 2 is a schematic diagram of a polarizer array.

FIGS. 3A-3D illustrate displacements of polarizer array microelements with respect to an optical image as produced during an image scan.

DETAILED DESCRIPTION

Figure 1:
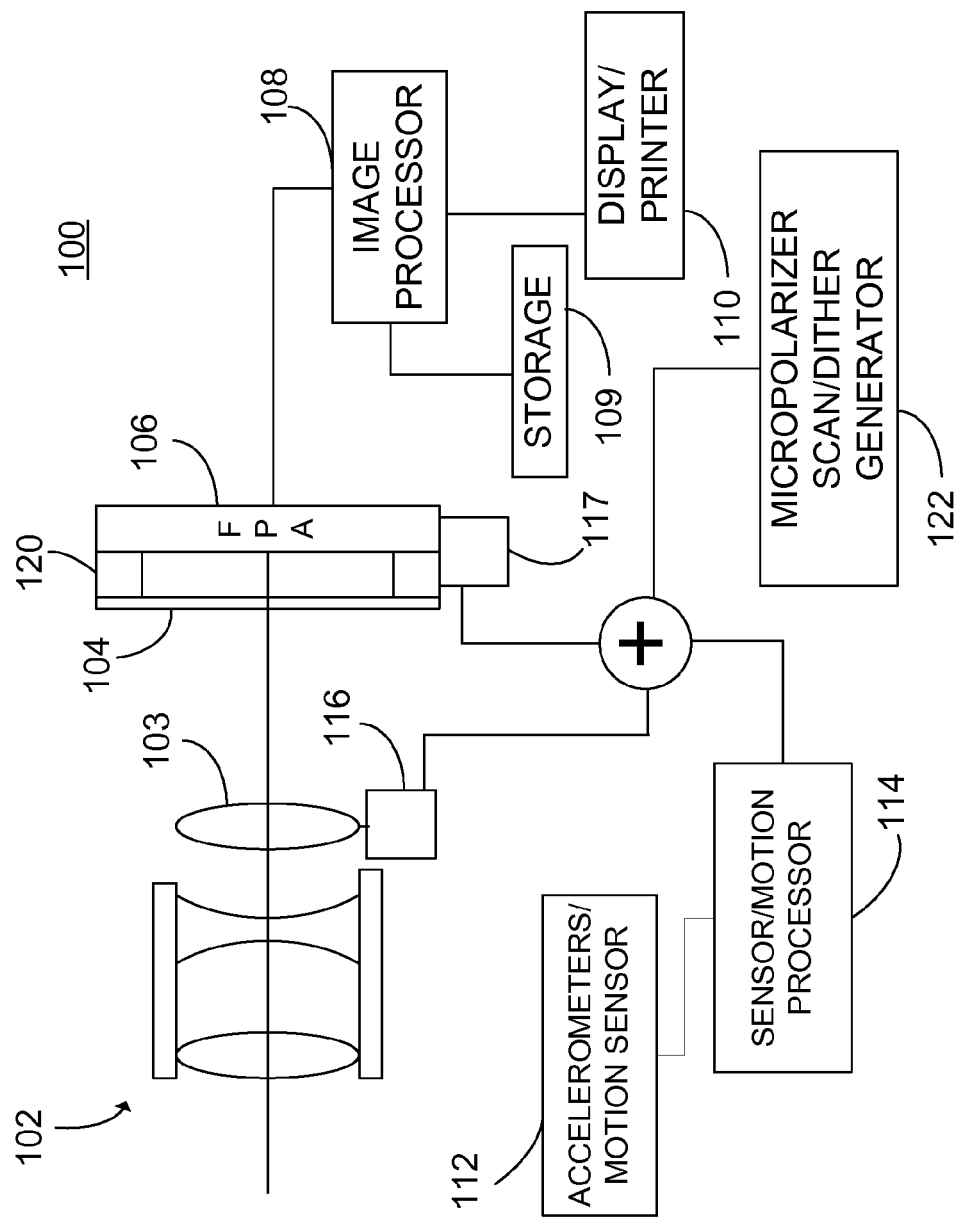
FIG. 1 is a schematic block diagram of a representative polarization camera.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Apparatus and methods for acquisition of polarization based images are described below. As used herein, a stored image is a representation of a light flux associated with an optical image of an object. Such a stored image can be represented as an array of image values such as red, green, and blue irradiance values at each image location. Alternatively, a stored image can be a monochromatic image stored as an array of a single irradiance values. A displayed image is a visual representation of an image such as display of a stored image on a display device such as a liquid crystal or plasma display, or a printed representation of a stored image. As used herein, an optical image is an image formed with electromagnetic radiation in a wavelength range of between about 100 nm and 100 µm, and typically between about 300 nm and 10 µm. Suitable image sensors include bolometers, CCDs, CMOS detectors, photomultipliers, and photodiode arrays and are generally selected based on a wavelength range of interest.

Polarization based images can be configured to present various polarization characteristics. For example, images can be based on orientation of linear polarization, degree of polarization, relative handedness of circular polarization, orientation of elliptical polarization or other characteristics. Images can be based on one or all Stokes parameters or one or more elements of a Jones vector. An image can be based on one of such characteristics, or these characteristics can be combined in a pseudo-color image such that different characteristics are mapped to image brightness, hue, and saturation in a single displayed image. For example, irradiance, degree of linear polarization, and orientation of linear polarization can be represented as image brightness, saturation, and hue, respectively. The methods and apparatus described herein can provide such images, and for convenience, such images are referred to as polarization images.

Partially polarized incoherent light can be conveniently described based on a Stokes vector $S=[s_0\ s_1\ s_2\ s_3]^T=[I_H+I_V\ I_H-I_V\ I_{45}-I_{135}\ I_L-I_R]^T$, wherein intensities $I_H, I_V, I_{45}, I_{135}, I_L, I_R$ are intensities measured with horizontal, vertical, 45 degree, 135 degree, left-circular, and right-circular polarizers, respectively. The elements of the Stokes vector are also referred to as Stokes parameters. A received optical image has spatially varying Stokes parameters that can be used to define various stored images.

Some typical polarization properties of interest in imaging include angle of polarization, degree of linear polarization (DOLP), degree of circular polarization (DOCP), and degree of polarization (DOP). The angle of polarization is the angle of the major axes of the polarization ellipse with respect to an x-axis. DOCP is a fraction of intensity attributable to circular states of polarization (SOP). DOLP is a fraction of intensity attributable to linear SOPs. DOP is a fraction of intensity attributable to any SOPs. The following table shows the relationship of these properties to the Stokes parameters:

| Characteristic | Stokes Parameters |
|---|---|
| angle of polarization ($\Psi$) | $\Psi = \frac{1}{2} \arctan(s_2/s_1)$ |
| degree of circular polarization | $DOCP = s_3/s_0$ |
| degree of linear polarization | $DOLP = \sqrt{s_1^2+s_2^2}/s_0$ |
| degree of polarization | $DOP = \sqrt{s_1^2+s_2^2+s_3^2}/s_0$ |

Images using the methods and apparatus described below can be based on these or other characteristics, individual Stokes parameters, or other combinations of Stokes parameters that can be fixed throughout an image or be selected for individual image sensor pixels or combinations of pixels. Additional details can be found in Tyo et al., Review of Passive Imaging Polarimetry for Remote Sensing Applications, Applied Optics 45:5453-5469 (August 2006).

FIG. 1 is a schematic block diagram of a representative polarization camera 100 that includes a lens 102, a micropolarizer array 104, and a focal plane image sensor array (FPA) 106. Typically the FPA 106 is a CCD or CMOS sensor that includes a plurality of pixel sensors that are arranged in a series of rows and columns. The focal plane array produces an electrical image signal that is coupled to an image processor 108. Typically, the image processor 108 is configured to produce an encoded image in a compressed format such as an MPEG format based on the raw image signal in order to reduce image storage requirements. The image processor can also be configured to store the encoded image or the raw image in a memory or other data storage device 109, and communicate the stored image to one or more remote computers or other devices as well as provide a viewable image on a display device 110.

The lens 102 is generally situated so as to produce a focused image of an object at the focal plane array 106 using a manual or autofocus mechanism (not shown in FIG. 1). The lens 102 is shown in FIG. 1 as a 3-element lens, and includes a movable ("floating") element 103. The camera 100 can also include mechanical mountings for external optical filters, and mechanical or electrical adjustment mechanisms for controlling lens effective aperture (f-number), exposure duration, and other user selectable features. For convenience in the description, these features are omitted from FIG. 1 and are not discussed further herein.

One or more sensors 112 such as rotational sensors, accelerometers, displacement sensors, gyroscopic or linear or angular sensors are coupled to a sensor processor 114 that produces a compensation signal based on camera motion such as linear or angular motion, or vibration based on one or more sensor signals. The sensor processor 114 can be coupled to one or more actuators such as lens actuator 116 and/or an FPA actuator 117 configured to produce a displacement of the lens element or the FPA so as to eliminate, reduce, or otherwise compensate camera motion. Typical actuators include piezoelectric devices and electromagnets.

As shown in FIG. 1, the micropolarizer array 104 is secured to the FPA 106 array by a mounting assembly 120 so that the micropolarizer array 104 and the FPA 106 move together as driven by the FPA actuator 117. In other examples, the micropolarizer array 104 can be configured to move independently of the FPA 106, or to be selectively secured to the FPA 106 in response to a user selection of imaging mode. For example, image stabilization can be turned off, and the micropolarizer array 104 driven so as to be scanned with respect to the FPA 106. The sensor processor 114 is generally configured to compensate camera motion and/or object motion by suitable motion of the lens element 103 or the FPA 106. A micropolarizer scan or dither generator 122 driver can be coupled to the sensor processor 114 or directly to the lens element actuator 116 or the FPA/micropolarizer array actuator 117 so as to scan elements of the micropolarizer array. In this way, a measurement of each optical image portion with each of a plurality of polarizer elements can be obtained. This scanning process is discussed in detail below with reference to FIGS. 3A-3D.

FIG. 2 illustrates a representative micropolarizer array 200 based on a 2 row by 3 column array of polarizer pixels 202-207 that include micropolarizer elements 202A-202D, 203A-203D, 204A-204D, 205A-205D, 206A-206D, and 207A-207D, respectively. Typically, arrays having hundreds or thousands of elements are used, and the elements can be arranged in a rectangular array, typically selected to match the arrangement of pixels an image sensor array so that each sensor element can be associated with a micropolarizer element. The micropolarizer elements 202A-207D can be selected to analyze received optical flux for particular polarizations. For example, the elements 202A-207A can be linear polarizers oriented with a transmission axis perpendicular to a reference axis 210, the elements 202B-207B can be linear polarizers oriented at an angle 45 degrees counterclockwise from the axis 210, the elements 202C-207C can be linear polarizers with a transmission axis at 45 degrees clockwise from the reference axis 210, and the elements 202D-207D can be linear polarizers with a transmission axis parallel to the reference axis 210. This configuration is suitable for estimation of the three linear Stokes parameters ($s_0$, $s_1$, and $s_2$). Other types of microelements can be used such as linear polarizers in other orientations, circular or elliptical polarizers, as well as polarization insensitive elements such as transmissive window elements, and color or neutral density filters. In addition, a filter array can be based on solid or liquid crystal materials and coupled so that the polarization analysis provided by one or more of the elements can be time varying. Other types of polarizers and polarization dependent elements such as wire grids, dichroic polarizers, and retardation elements can be used. The microelements need not be arranged in a regular array but can be randomly situated or situated in some other fashion. As shown in FIG. 2, actuators 214, 216 are situated to receive signals so as to displace the micropolarizer array 200. Typically, a scan/dither generator 220 is configured to apply a periodic scan burst such that all elements (or selected elements) of a polarizer pixel are scanned in a series of image acquisitions.

FIGS. 3A-3D illustrate acquisition of images using an arrangement such as that illustrated in FIG. 2. An optical image 302 formed at an image sensor is processed by micropolarizer elements 304A-304D of a polarizer pixel 304. For convenient illustration, additional polarizer pixels are not shown. Each of the micropolarizer elements can be fixed with respect to a pixel of an image sensor, and the micropolarizer and image sensor scanned together. FIGS. 3A-3D show the polarizer pixel 304 displaced so that an image portion 308 is processed by the micropolarizer elements 304A-304D, respectively, to obtain corresponding image intensities $I_A, \ldots, I_D$. For example, the polarizer pixel 304 can be sequentially displaced, and image intensities $I_A, \ldots, I_D$ at each displacement acquired and stored. A polarization based rendering of the image portion 308 can be obtained by combining the corresponding stored values as desired. Typically, a polarization camera can be configured so that images are acquired for each of the micropolarizer element displacements of FIGS. 3A-3D, but a user can select to scan the micropolarizer elements to only selected displacements.

With scanning such as shown in FIGS. 3A-3D, image signals produced with a 4 row by 4 column array of sensor pixels have the form:

| Representative Image Signal $I_1$ | | | |
|---|---|---|---|
| $I_A$ | $I_B$ | $I_A$ | $I_B$ |
| $I_C$ | $I_D$ | $I_C$ | $I_D$ |
| $I_A$ | $I_B$ | $I_A$ | $I_B$ |
| $I_C$ | $I_D$ | $I_C$ | $I_D$ |
| Representative Image Signal $I_2$ | | | |
| $I_B$ | $I_A$ | $I_B$ | $I_A$ |
| $I_D$ | $I_C$ | $I_D$ | $I_C$ |
| $I_B$ | $I_A$ | $I_B$ | $I_A$ |
| $I_D$ | $I_C$ | $I_D$ | $I_C$ |
| Representative Image Signal $I_3$ | | | |
| $I_C$ | $I_D$ | $I_C$ | $I_D$ |
| $I_A$ | $I_B$ | $I_A$ | $I_B$ |
| $I_C$ | $I_D$ | $I_C$ | $I_D$ |
| $I_A$ | $I_B$ | $I_A$ | $I_B$ |
| Representative Image Signal $I_4$ | | | |
| $I_D$ | $I_C$ | $I_D$ | $I_C$ |
| $I_B$ | $I_A$ | $I_B$ | $I_A$ |
| $I_D$ | $I_C$ | $I_D$ | $I_C$ |
| $I_B$ | $I_A$ | $I_B$ | $I_A$ | wherein I refers to an irradiance, and subscripts A-D refer to polarizer microelements. Typically, scans will be not be exactly one pixel (or an integer number of pixels), and the resulting image signals are associated with combinations of micropolarizer elements.

For any selected pixel, a polarization analysis based on any selected combination of microelements or a single microelement is available based on $I_1, \ldots, I_4$. If an image signal associated with an "A" microelement polarization analysis is to be determined, values situated in the odd rows and columns of $I_1$, the even rows and even columns of $I_2$, the odd rows and even columns of $I_3$, and the even rows and even columns of $I_4$ can be extracted into a signal polarization image. Similar selection permits extraction of images associated with each of the microelement polarizations. In some examples, an image based on a mixture of microelement polarizations can provide an "A" analysis in one image portion and a "B" analysis in another. For example, microelements can be selected to produce images having a darkened sky and attenuate reflections from dielectric surfaces.

Figure 4:
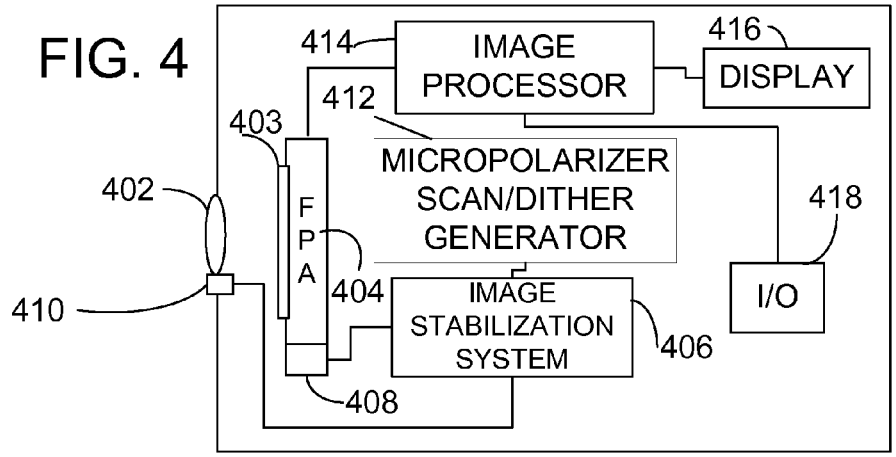
FIG. 4 is a schematic diagram of an alternative embodiment of a polarization camera.

Another representative embodiment of a polarizing camera 400 is illustrated in FIG. 4. The camera 400 includes a lens 402 that is situated to project an optical image of an object through a micropolarizer 403 to an image sensor 404. In this example, the micropolarizer 403 is secured to the image sensor 404. In one embodiment, the micropolarizer array 403 can be coated directly on the FPA 404 with little or no gap. An image stabilization system 406 is coupled to an image sensor actuator 408 and/or a lens element actuator 410 so as to displace the image sensor/micropolarizer array and/or one or more lens elements to maintain a more constant image location even if the camera 400 is moved. A scan or dither generator 412 is coupled to the image stabilization system 406 so that the micropolarizer moves with respect to the optical image so that the image sensor can analyze each portion of the image with one or more micropolarizer elements. An image processor 414 receives, stores, and processes image data, typically by adding, subtracting, or determining a ratio or other combination of image data corresponding to two or more polarization states. Such combined images can be delivered to a display 416 for viewing, and image data can be communicated via an input/output port 418. Alternatively, one or more individual images associated with a single state of polarization can be displayed, or a combined image based on a spatially varying polarization analysis can be determined by selecting image data corresponding to selected micropolarizer elements. In some examples, the image processor 414 Fourier transforms a stored image acquired at a single displacement, applies a filter in a spatial frequency domain, and produces a stored image based on an inverse Fourier transform of the filtered data.

Figures 5A, 5B:
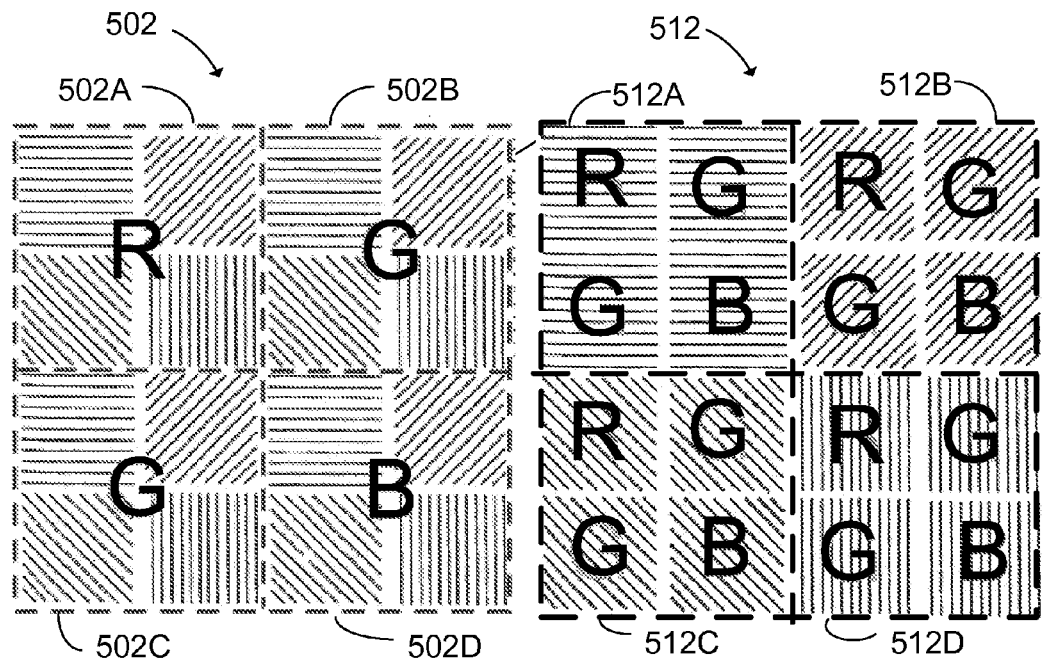
FIGS. 5A-5B illustrate polarizer array configurations situated with respect to red, green, and blue sensor pixels.

Color polarization images can be acquired using micropolarizer arrays in combination with color filters. With reference to FIG. 5A, a micropolarizer 502 includes polarizer pixels 502A, 502D associated with red and blue color filters, respectively, and polarizer pixels 502B-502C associated with a green color filter. Each of the polarizer pixels 502A-502D includes four linear polarizer microelements oriented as shown. With reference to FIG. 5B, a micropolarizer 512 includes polarizer pixels 512A-512D that each include single polarizer microelements associated with red and blue color filters, and two microelements associated with a green color filter. The polarizer pixels 512A-512D are based on linear polarizations (horizontal, 45 degrees, -45 degrees, vertical) as shown in FIG. 5B. The arrangements of FIGS. 5A-5B are representative examples, but other arrangements of micropolarizer elements and color filters can be used. For example, instead of using red, green and blue filters, a set of infrared and ultraviolet band filters can be used. In addition, the polarizer pixels can include circular or elliptical polarizers, or other polarization sensitive elements.

While a microelement polarizer can be scanned so that each portion of an image is sampled based on all microelement polarizations, images obtained without such scanning can be combined. Such images can be provided as a final image, or used to determine subsequent scan patterns to obtain images having a higher resolution or including more detailed polarization analysis. While such unscanned or partially scanned image acquisitions can be useful, combining irradiance values I from different sensor pixels can produce so-called instantaneous field of view errors as the different sensor pixels are associated with different portions of the imaging field of view. Thus, combining such irradiance values to reconstruct image polarization can result in polarization artifacts due to the reconstruction process. Methods and apparatus are described below that can reduce or eliminate such reconstruction errors. For convenience in describing representative examples, an intensity measured an $(m, n)^{th}$ sensor pixel of an array of sensor pixels can be written as:

$$I(m,n) = S_A(m,n)^T \cdot S_i(m,n),$$

wherein $S_A(m, n)$ is an analyzer Stokes vector of the $(m, n)^{th}$ sensor pixel (determined by the associated micropolarizer element), and $S_i(m, n)$ is a Stokes vector of the optical image received at the image sensor/micropolarizer. Image sensor pixels are generally responsive only to irradiance, and the analyzer Stokes vector corresponds to the first row of a Mueller matrix that is associated with the polarization properties of a micropolarizer element.

The analyzer Stokes vector $S_A(m, n)$ is based on the arrangement of micropolarizer elements in a polarizer pixel. For micropolarizer elements that are periodically or semi-periodically arranged, the analyzer Stokes vector $S_A(m, n)$ will have corresponding periodicities. Thus, a Fourier transform of the product $S_A(m, n)^T \cdot S_i(m, n)$ will have spatial frequency components that are based on the periodic polarization analysis imposed by the micropolarizer elements. In some cases, the pattern of the analyzer Stokes vectors at the FPA produces a spatial frequency domain modulation so that polarization information concerning an image to be evaluated can be extracted by filtering the Fourier transform of the product to attenuate or eliminate other frequency components, and then demodulate and apply an inverse Fourier transform to the filter frequency domain data.

Figure 6A:
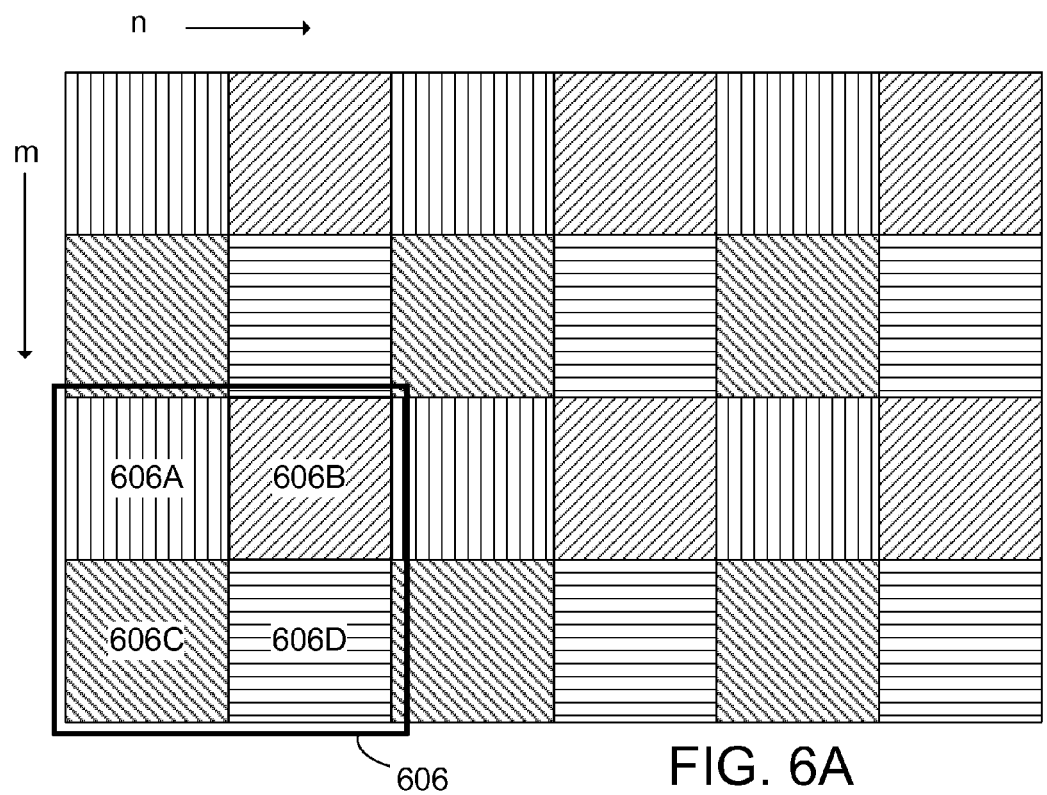
FIG. 6A is schematic diagram of a representative polarizer array based on linear polarizers.

The spatial frequency based analysis can be illustrated with reference to a representative micropolarizer configuration as illustrated in FIG. 6A. A two dimensional array of polarizer pixels comprises a plurality of pixels such as representative pixel 606 that has linear micropolarizer elements 606A-606D that are aligned vertically, at 45 degrees, at −45 degrees, and horizontally, respectively. For convenient explanation, each of the micropolarizer elements is associated with a single image sensor pixel.

Mueller matrix elements for each of the micropolarizer elements are provided in the table below (a common factor of ½ is omitted).

| Analyzer Stokes Vector for Linear Polarizers | | | | |
|---|---|---|---|---|
| Angle | $S_{A1}$ | $S_{A2}$ | $S_{A3}$ | $S_{A4}$ |
| V | 1 | 1 | 0 | 0 |
| 45° | 1 | 0 | 1 | 0 |
| −45° | 1 | 0 | −1 | 0 |
| H | 1 | −1 | 0 | 0 |

In the arrangement of FIG. 6A, the analyzer Stokes vector can be more simply written as:

$$S_A(m, n) = 1/2 \begin{pmatrix} 1 \\ \frac{1}{2}(\cos(m\pi) + \cos(n\pi)) \\ \frac{1}{2}(\cos(m\pi) - \cos(n\pi)) \\ 0 \end{pmatrix}$$

Application of $S_A(m, n)$ to the Stokes vectors at each pixel location ($S_i(m, n)$) produces the following intensity distribution:

$$I(m,n) = \frac{1}{2}\{s_0(m,n) + \frac{1}{2}\cos(m\pi)[s_1(m,n) + s_2(m,n)] + \frac{1}{2}\cos(n\pi)[s_1(m,n) - s_2(m,n)]\}$$

Inspection of this expression for I(m, n) shows that a Fourier transform should include terms associated with the sum of $s_1$ and $s_2$ as modulated by $\cos(m\pi)$ and terms associated with the difference of $s_1$ and $s_2$ as modulated by $\cos(n\pi)$.

A discrete space Fourier transform for positive frequencies can be expressed as:

$$\hat{I}(\xi,\eta) = \frac{1}{2}\{\hat{S}_0(\xi,\eta) + \frac{1}{4}[\hat{S}_1(\xi-\frac{1}{2},\eta) + \hat{S}_2(\xi-\frac{1}{2},\eta)] + \frac{1}{4}[\hat{S}_1(\xi,\eta-\frac{1}{2}) - \hat{S}_2(\xi,\eta-\frac{1}{2})]\},$$

wherein $\xi$ and $\eta$ are horizontal and vertical spatial frequencies, respectively, and $\hat{S}_0$, $\hat{S}_1$, and $\hat{S}_2$ are the Fourier transforms of $s_0$, $s_1$, and $s_2$, respectively. A component (or sideband) of $\hat{I}(\xi, \eta)$ situated about a horizontal spatial frequency $\xi = \frac{1}{2}$ corresponds to $s_1 + s_2$ and a component (or sideband) of $\hat{I}(\xi, \eta)$ situated about a vertical spatial frequency $\eta = \frac{1}{2}$ corresponds to $s_1 - s_2$. As long as the Stokes parameter images are sufficiently band limited, the Stokes parameters can be reconstructed without error.

Figure 7A:
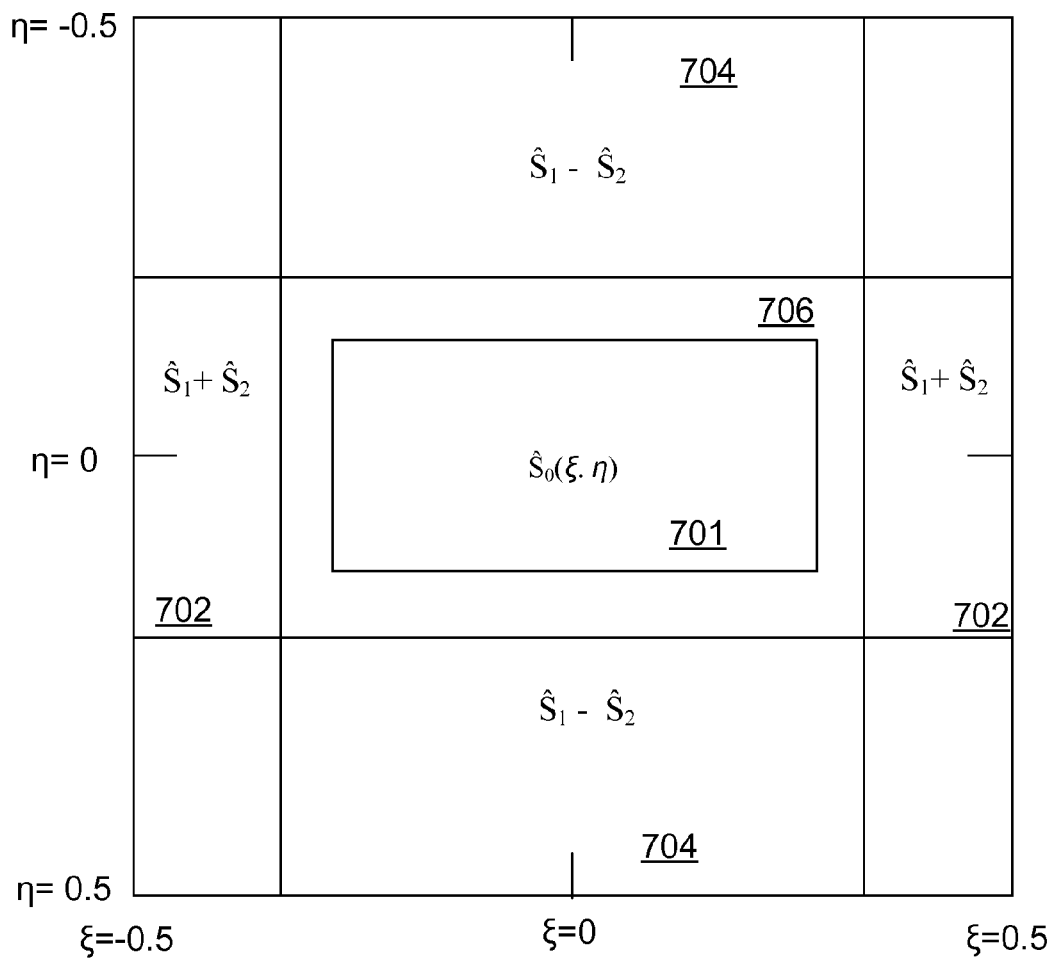

A representative spatial frequency distribution is shown in FIG. 7A. A two dimensional spatial frequency plane has a central region 701 associated with $\hat{S}_0(\xi, \eta)$, and regions 702, 704 associated with $s_1 + s_2$ and $s_1 - s_2$, respectively. A region 706 separates these frequency components. In the example of FIG. 7A, horizontal and vertical frequency scaling are different, but in other examples the scaling can be the same. In addition, the modulation provided by the micropolarizer can be selected to produce other or additional sidebands at sum or difference frequencies, or to include frequency distributions that extend along other directions than horizontal and vertical in the spatial frequency domain.

In order to determine $s_0$, the spatial frequency spectrum $\hat{I}(\xi, \eta)$ can be low pass filtered to attenuate or eliminate contributions from $\hat{S}_1$ and $\hat{S}_2$, and the filtered spectrum inverse Fourier transformed. Similarly, $s_1+s_2$ and $s_1-s_2$ can be obtained by applying high pass filters to attenuate or eliminate contributions from $\hat{S}_0$, and the filtered spectrum inverse Fourier transformed to produce $s_1+s_2$ and $s_1-s_2$, which can be solved to determine $s_1$ and $s_2$.

Superior Stokes parameter image construction results when $s_0$, $s_1$, and $s_2$ are band limited. For example, if $s_0$ is spatially band limited to a maximum spatial frequency $W_0$ such that $\sqrt{\xi^2+\eta^2}<W_0$ and $s_1$, and $s_2$ are band limited to a maximum spatial frequency $W_1$ such that $\sqrt{\xi^2+\eta^2}<W_1$, then aliasing is absent if $W_1+W_1<\frac{1}{2}$. Moreover, for such band limited conditions, reconstruction is perfect absent noise and instrumentation errors. Thus, errors associated with combining different image areas corresponding to differing micropolarizers can be eliminated. For Stokes parameters that are not band limited, additional spatial filters can be applied before detection to impose band limiting.

Figure 8:
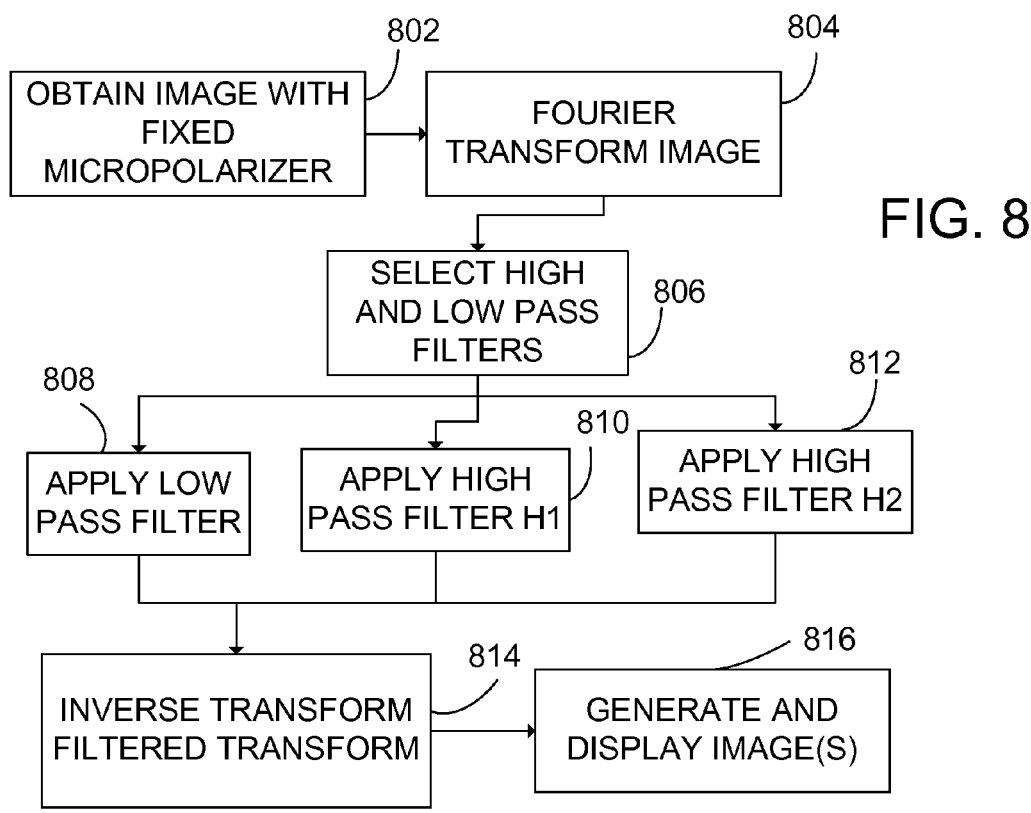
FIG. 8 is a block diagram of a method of processing polarization based images produced with a polarizer array.

An image reconstruction method based on spatial frequency transforms is illustrated in FIG. 8. In a step 802, an image sensor is exposed to an image through a micropolarizer array to obtain an image S(m, n), wherein m, n are positive integers that indicate a sensor pixel column and row, respectively. In a step 804, the image S(m, n) is transformed into the spatial frequency domain to obtain the Fourier transform $\hat{I}(\xi, \eta)$. Generally two dimensional images are intended, and a two dimensional transform is applied, but a one dimensional transform can also be used. One more high pass filters and a low pass filter $H_0$ are defined in a step 806. Typically two high pass filters $H_1$, $H_2$ are selected, one for each spatial direction, and it is convenient to use the same filter function for both. The Fourier transform $\hat{I}(\xi, \eta)$ is then low pass filtered in a step 808, high pass filtered in a first direction with $H_1$ in a step 808, and high pass filtered with $H_2$ in a step 810. The filtered transforms are then demodulated and inverse transformed in a step 812 to produce images that are associated with spatial distributions of Stokes parameters, i.e., images based on Stokes parameters and combinations thereof. In one example, the images correspond to $s_0(m, n)$, $s_1(m, n)+s_2(m, n)$, and $s_1(m, n)-s_2(m, n)$. These images can be combined to determine images associated with the first three Stokes parameters individually, or an combination thereof. Additional frequency domain filters can be applied to guarantee band limiting or to otherwise shape the transform $\hat{I}(\xi, \eta)$. For example, other periodic effects in the micropolarizer array can be compensated.

Figures 6B, 7B:
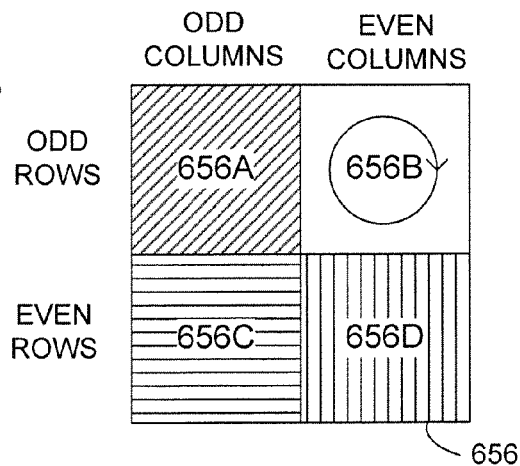
FIG. 6B is schematic diagram of a portion of a representative polarizer array based on linear polarizers and a circular polarizer.
FIGS. 7A-7B are representations of a spatial frequency plane identifying spatial frequency regions associated with selected image Stokes parameters or combinations of image Stokes parameters based on polarizer arrays illustrated in FIGS. 6A-6B, respectively.

FIG. 6B illustrates another representative micropolarizer configuration. A polarizer pixel 656 includes a linear micropolarizer element 656A having an axis at 45 degrees and linear polarizers 656C, 656D that have horizontal and vertical axes, respectively. The polarizer pixel 656 also includes a circular micropolarizer element 656B. The analyzer Stokes vectors for each of the micropolarizer elements are listed below. (These are based on the first rows of the corresponding Mueller matrices.)

| Analyzer Stokes Vectors for FIG. 6B | | | |
|---|---|---|---|
| m odd, n odd | m odd, n even | m even, n odd | m even, n even |
| $\frac{1}{2}\begin{bmatrix}1\\0\\1\\0\end{bmatrix}$ | $\frac{1}{2}\begin{bmatrix}1\\0\\0\\1\end{bmatrix}$ | $\frac{1}{2}\begin{bmatrix}1\\1\\0\\0\end{bmatrix}$ | $\frac{1}{2}\begin{bmatrix}1\\-1\\0\\0\end{bmatrix}$ |

These can be combined in the following expression for the analyzer Stokes vector:

$$S_A = \frac{1}{2}\begin{bmatrix} 1 \\ \frac{1}{2}(1+\cos m\pi)\cos n\pi \\ \frac{1}{4}(1-\cos m\pi)(1-\cos n\pi) \\ \frac{1}{4}(1-\cos m\pi)(1+\cos n\pi) \end{bmatrix}$$

Applying this analytic Stokes vector to the spatially varying image Stokes vector $S_i(m, n)$, the resulting intensity is:

$$I(m, n) = \frac{1}{2}\left[\left(s_0 + \frac{s_2}{4} + \frac{s_3}{4}\right) + \cos n\pi\left(\frac{s_1}{2} - \frac{s_2}{4} + \frac{s_3}{4}\right) - \cos m\pi\left(\frac{s_2}{4} + \frac{s_3}{4}\right) + \cos n\pi\cos m\pi\left(s_0 + \frac{s_2}{4} - \frac{s_3}{4}\right)\right]$$

The Fourier transform of this intensity will include a first component corresponding to a frequency base band associated with a combination of $s_0$, $s_2$, and $s_3$. A second component corresponds to a side band centered at $\xi=\pm\frac{1}{2}\eta=0$ and is associated with a combination of $s_1$, $s_2$, and $s_3$. A third component corresponds to a side band centered at $\xi=0$, $\eta=\pm\frac{1}{2}$ and is associated with a combination of $s_2$, and $s_3$. A fourth component is centered at $\xi=\pm\frac{1}{2}$, $\eta=\pm\frac{1}{2}$ and is associated with a combination of $s_0$, $s_2$, and $s_3$. These four side bands can be independently filtered, demodulated, and inverse Fourier transformed. The resulting images can then be combined to estimate all four Stokes parameters.

FIG. 7B illustrates the location of these side bands in the spatial frequency plane, with a base band region 751, horizontal and vertical side band regions 752, 754, respectively, and side bands 755 displaced from zero spatial frequency both horizontally and vertically.

The selected high and low pass filters can be selected based on the image modulation associated with the analyzer Stokes vector $S_A(m, n)$. In some examples, such as the micropolarizer arrays of FIGS. 6A-6B, the Stokes vector has a convenient, simple analytical representation that permits determination of suitable filters and the spatial frequency location of the Stokes parameters or combinations of interest. In other micropolarizer arrangements, suitable filters can be selected based on numerical Fourier transforms of the spatially varying analyzer Stokes vector. Such calculations can be readily performed with a variety of computing devices such as a personal computer or a calculator.

Figure 10A:
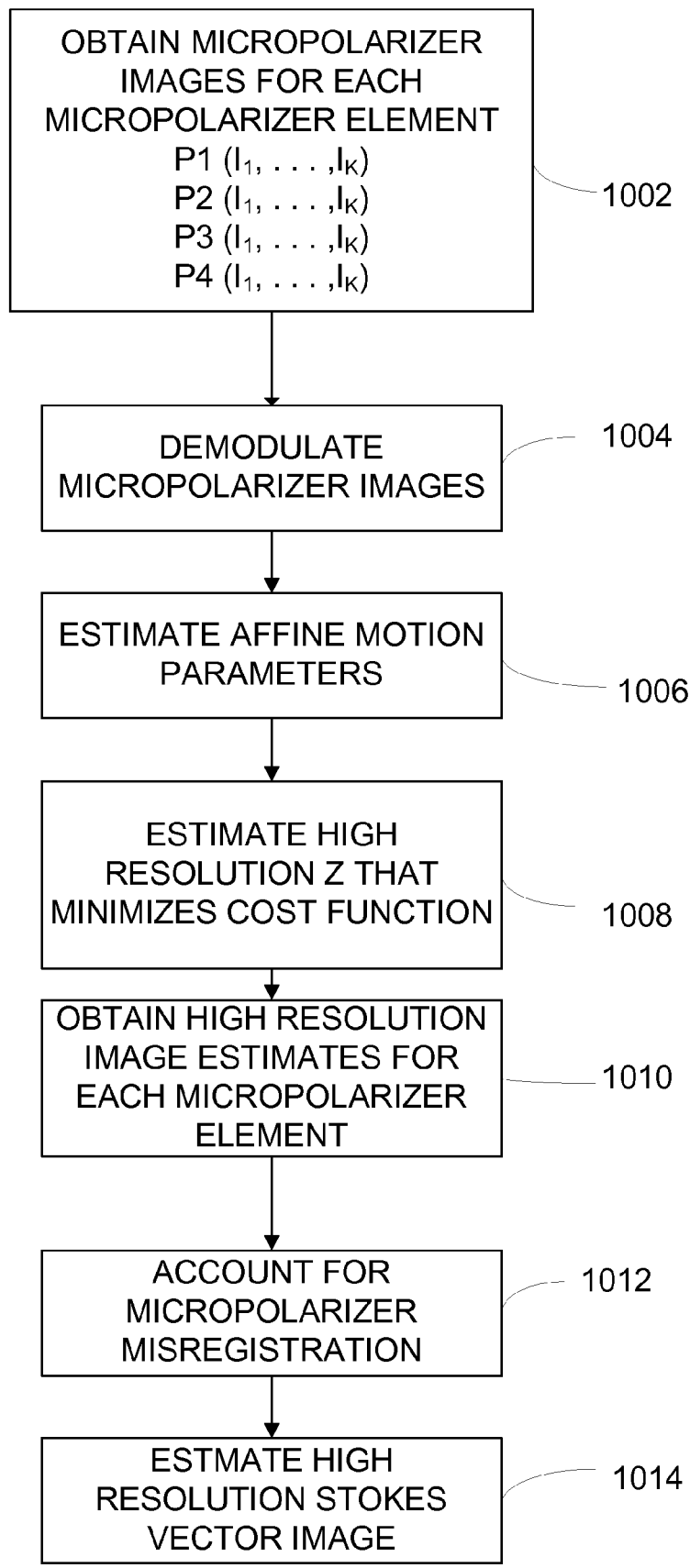
FIG. 10A is a block diagram of a representative method of producing enhanced resolution images.

While stored images can be processed frame by frame to reconstruct images, and micropolarizers can be scanned to reduce field of view artifacts, stored images can also be processed so as to provide enhanced-resolution polarization images for moving scenes and/or moving objects within scenes. By processing stored images based on a maximum a-posteriori (MAP) method, enhanced-resolution images of moving objects can be obtained. Alternatively, artifacts introduced by camera motion can be reduced or eliminated. A representative method is illustrated in FIG. 10A. In a step 1002, a series of micropolarizer-based images are obtained. For micropolarizers that include four micropolarizer elements P1, P2, P3, P4 in a polarizer pixel, sequences $(I_1, \ldots, I_K)$ of K four quarter resolution images are obtained. Each image of these four is then demodulated to produce four quarter resolution image sequences in a step 1004, wherein each image is associated with polarization analysis by a particular micropolarizer element type and orientation.

Frame to frame motion is then estimated at 1006. Motion estimation can be applied to each image sequence and then the estimates can be averaged. Or otherwise combined. Alternatively, an estimate can be determined from a selected sequence, and then applied to the remaining sequences. Representative procedures for motion estimation are described in Hardie et al., "Joint MAP registration and high resolution image estimation using a sequence of undersampled images," IEEE Trans. on Image Proc. 6:1621-1633 (1997) and Ratliff, "A generalized algebraic scene-based nonuniformity correction algorithm for infrared focal plane arrays." Ph.D. Dissertation, University of New Mexico (December 2004), but other methods can be used. Typically affine motion parameters associated with linear transformations such as rotation, scaling, shear, and shift (translation) are estimated. A resolution-enhanced image can then be estimated using a cost function in a step 1008. For example; image values z can be estimated based on a cost function such as:

$$C(z) = \frac{1}{2}\sum_{m=1}^{pM}\left(y_m - \sum_{r=1}^{N} w_{m,r} z_r\right)^2 + \frac{\lambda}{2}\sum_{i=1}^{N}\left(\sum_{j=1}^{N}\alpha_{i,j} z_j\right)^2,$$

wherein $z_j$ refers to estimated enhanced-resolution image values, $\alpha_{i,j}$ are regularization parameter weights, $\lambda$ is a smoothness parameter, $w_{m,n}$ are weights associated with a discrete point spread function, $y_m$ refers to measured image values, N is a number or pixels in a resolution-enhanced image, and pM is a number of measured image values to be used in the cost calculation. For convenience, measured and resolution-enhanced image values (y and z, respectively) can be processed as one-dimensional arrays, but are generally stored or displayed as two dimensional arrays. In some examples, N is a twice the number of polarizer pixels in the micropolarizer array, but enhanced-resolution images can include fewer or more pixels.

High resolution images for each of the micropolarizer element types P1-P4 are then obtained in a step 1010. Because the micropolarizer elements are displaced, these high resolution images are not properly registered with respect to each other. In a step 1012, such misregistration errors are compensated or eliminated. In a step 1014, a high resolution Stokes vector image is obtained. The Stokes vector image can provide estimates for one, some, or all Stokes parameters as a function of image location. Other images can be produced such as DOP, DOLP, DOCP, or other polarization based images.

Figure 10B:
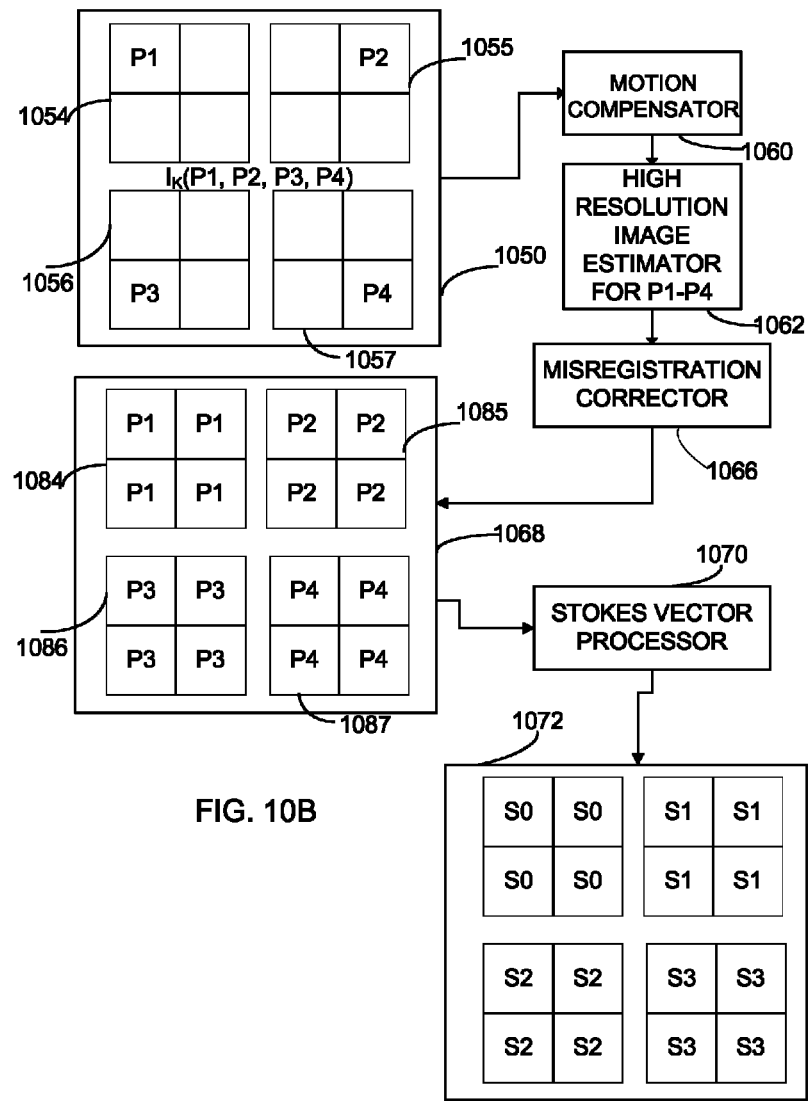
FIG. 10B illustrates a system for motion compensation in the generation of enhanced-resolution images.

A representative motion compensation system is illustrated in FIG. 10B. A memory 1050 is configured to store a series of images 1054-1057 corresponding micropolarizer element types P1-P4, respectively. For convenience, only image portions associated with a single polarizer pixel are shown. The stored images are communicated to a motion compensator 1060 and then to an image estimator 1062 that produces high resolution images for each of the micropolarizer element types P1-P4. A misregistration corrector 1066 aligns these high resolution images for storage in a memory 1068 as images. As shown, memory 1068 includes separate high resolution images 1084-1087 for each of the micropolarizer element types P1-P4. A Stokes vector processor 1070 determines Stokes parameter images based on the P1-P4 images. Images for some or all of the Stokes parameters can be obtained and are determined based on an analysis Stokes vector associated with the microelement polarizer types and their arrangement within a polarizer array. As shown in FIG. 10B, a memory 1072 is shown as storing enhanced resolution image associated with the Stokes parameter $s_0$-$s_3$.

The method described above can also be used in conjunction with scanned micropolarizers, especially if the micropolarizer elements are not completely displaced. In some scans micropolarizer elements are displaced sufficiently so as to be situated at a previous location of a different micropolarizer element, smaller displacements or other displacements that are not integer multiples of micropolarizer element period can be used.

Figure 9:
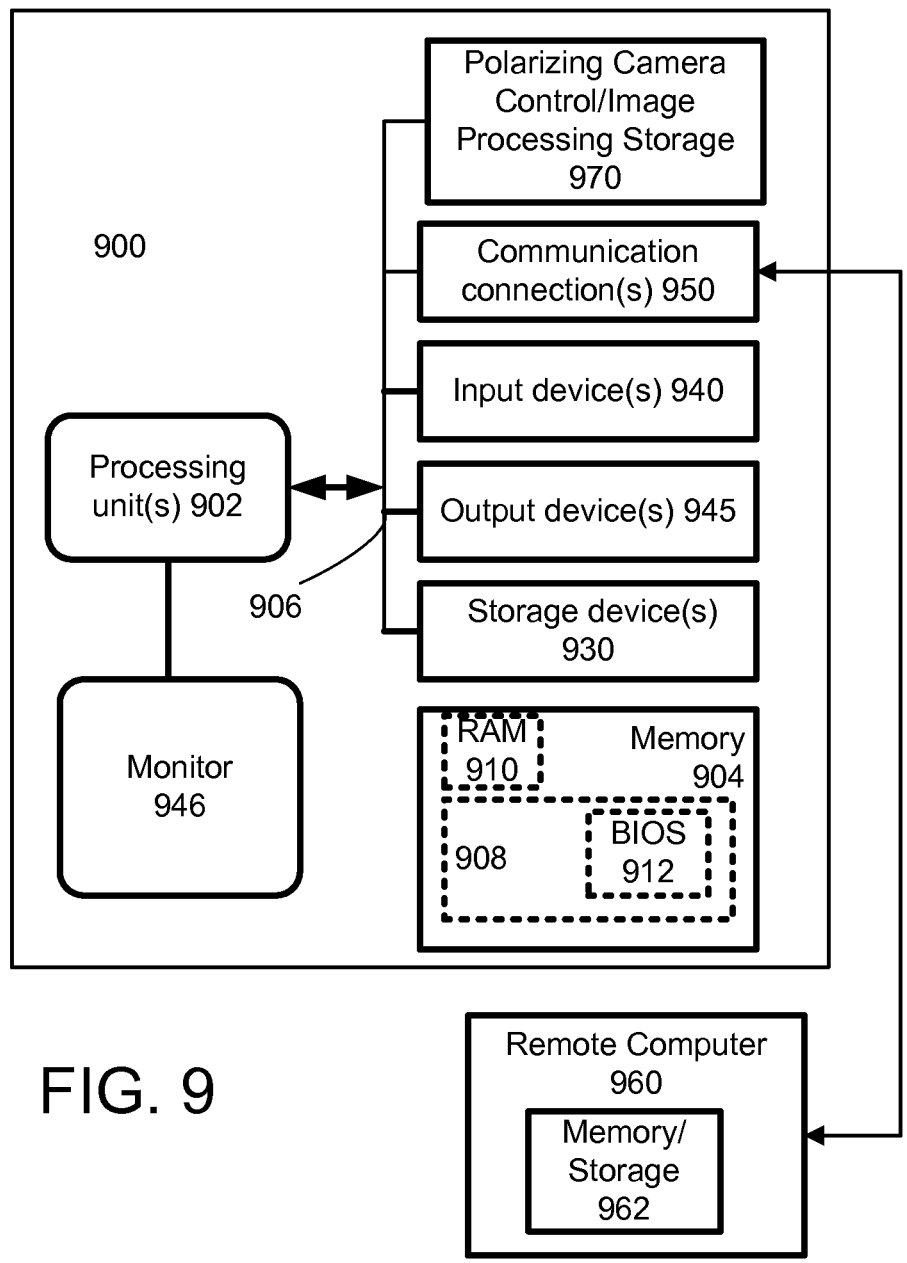
FIG. 9 is a representative computing environment for implementation of the disclosed image processing methods.

FIG. 9 and the following discussion are intended to provide a brief, general description of an exemplary computing environment in which the disclosed technology may be implemented. The disclosed image processing methods can be implemented with a dedicated processor or a general purpose computer based on suitable computer-executable instructions, but is described below in the general context of computer-executable instructions, such as program modules, being executed by a personal computer (PC). In many cases, it is convenient to provide a camera with an on-board processor. Generally, program modules for the disclosed methods include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed methods may also be practiced in distributed computing environments where tasks are performed by remote processing devices that are linked through a communications network. In a distributed computing environment, program modules may be located in both local and remote memory storage devices.

With reference to FIG. 9, an exemplary system for implementing the disclosed methods includes a general purpose computing device in the form of an exemplary conventional PC 900, including one or more processing units 902, a system memory 904, and a system bus 906 that couples various system components including the system memory 904 to the one or more processing units 902. The system bus 906 may be any of several types of bus structures including a memory bus or memory controller, a peripheral bus, and a local bus using any of a variety of bus architectures. The exemplary system memory 904 includes read only memory (ROM) 908 and random access memory (RAM) 910. A basic input/output system (BIOS) 912, containing the basic routines that help with the transfer of information between elements within the PC 900, is stored in ROM 908.

The exemplary PC 900 further includes one or more storage devices 930 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 906 by a hard disk drive interface, a magnetic disk drive interface, and an optical drive interface, respectively. The drives and their associated computer-readable storage media provide nonvolatile storage of computer-readable instructions, data structures, program modules, and other data for the PC 900. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 930 including an operating system, one or more application programs, other program modules, and program data. A user may enter commands and information into the PC 900 through one or more input devices 940 such as a keyboard and a pointing device such as a mouse. Other input devices may include a digital camera, microphone, joystick, game pad, satellite dish, scanner, or the like. These and other input devices are often connected to the one or more processing units 902 through a serial port interface that is coupled to the system bus 906, but may be connected by other interfaces such as a parallel port, game port, or universal serial bus (USB). A monitor 946 or other type of display device is also connected to the system bus 906 via an interface, such as a video adapter. Other peripheral output devices, such as speakers and printers (not shown), may be included. User input/output devices can be provided on a camera body as well.

The PC 900 may operate in a networked environment using logical connections to one or more remote computers, such as a remote computer 960. In some examples, one or more network or communication connections 950 are included. The remote computer 960 may be another PC, a server, a router, a network PC, or a peer device or other common network node, and typically includes many or all of the elements described above relative to the PC 900, although only a memory storage device 962 has been illustrated in FIG. 9. The personal computer 900 and/or the remote computer 960 can be connected to a logical a local area network (LAN) and a wide area network (WAN). Such networking environments are commonplace in offices, enterprise-wide computer networks, intranets, and the Internet. Control and image processing instructions for a polarizing camera such can be provided in dedicated storage 970.

Having described and illustrated the principles of the disclosed technology with reference to several examples, it will be recognized that the illustrated embodiments can be modified in arrangement and detail without departing from such principles. For instance, elements of the illustrated embodiment shown in software may be implemented in hardware and vice-versa. Also, the technologies from any example can be combined with the technologies described in any one or more of the other examples. In view of the many possible embodiments to which these principles may be applied, it should be recognized that the illustrated embodiments are examples and should not be taken as a limitation on the scope of the invention. For instance, various components of camera systems described herein may be combined in function and use. We therefore claim as our invention all subject matter that comes within the scope and spirit of the appended claims.

We claim:

1. A camera, comprising:
   an image sensor comprising a plurality of sensor pixels and configured to produce image data based on an optical image formed at the image sensor;
   a micropolarizer array comprising a plurality of micropolarizer elements corresponding to the sensor pixels and situated to receive image-forming light, to micropolarizer-modulate the image-forming light, and to direct the micropolarizer-modulated image-forming light to the image sensor;
   a scanner coupled to the micropolarizer array and configured to produce a relative displacement of the micropolarizer array with respect to the optical image; and
   an image processor coupled to the image sensor and configured to receive image data from the image sensor and produce a polarization image based on image data associated with at least two relative displacements of the micropolarizer and the optical image.

2. The camera of claim 1, wherein the image processor is configured to produce an enhanced resolution image based on evaluation of a cost function.

3. The camera of claim 1, further comprising a lens situated upstream of the image sensor and configured to form the image, wherein the scanner produces the relative displacement by displacing at least a portion of the lens.

4. The camera of claim 1, wherein:
   each of the sensor pixels of the image sensor includes at least two pixels associated with image color components, and
   the micropolarizer array includes microarray elements corresponding to the pixels associated with the image color components.

5. The camera of claim 1, wherein the micropolarizer array is fixed with respect to the image sensor.

6. The camera of claim 1, wherein the scanner is coupled to at least one sensor and is configured to produce a relative displacement of the image sensor and the optical image so as to at least partially compensate camera movement.

7. The camera of claim 6, further comprising an actuator coupled to the scanner and configured to displace the micropolarizer array and the image sensor with respect to the optical image.

8. The camera of claim 7, wherein the micropolarizer array is fixed with respect to the image sensor.

9. The camera of claim 1, wherein the polarization image corresponds to a degree of linear polarization, a degree of circular polarization, an angle of polarization, a degree of polarization, a Stokes parameter $s_1$, a Stokes parameter $s_2$, or a Stokes parameter $s_3$.

10. A camera, comprising:
    an image sensor comprising a plurality of sensor pixels and configured to produce image data based on an optical image formed at the image sensor;
    a micropolarizer array comprising a plurality of micropolarizer elements corresponding to the sensor pixels and situated to receive the optical image and direct a micropolarizer-processed optical image to the image sensor;
    an image-stabilization system configured to produce a relative displacement of the image sensor with respect to the optical image so as to compensate camera movement, where the image-stabilization system is further configured to produce a relative displacement of the optical image with respect to the elements of the micropolarizer array; and an image processor configured to receive image data from the image sensor and produce a polarization image based on image data associated with at least two relative displacements of the micropolarizer array and the optical image.

11. A method, comprising:
directing an optical image to a polarizer array situated at an image sensor;
producing at least two relative displacements of the polarizer array and the optical image such that different optical-image portions are substantially received at respective different polarizer-array elements;
acquiring image data associated with the at least two relative displacements; and
producing a polarization image based on the acquired image data.

12. The method of claim 11, further comprising producing at least one polarization image associated with a common state of polarization at the image sensor.

13. The method of claim 11, wherein the polarization image is associated with a degree of linear polarization, a degree of circular polarization, an angle of polarization, or a degree of polarization.

14. The method of claim 11, wherein the polarization image is associated with a Stokes parameter $s_1$, $s_2$, or $s_3$.

15. A method, comprising:
receiving an image associated with a polarizer array configured to apply a periodic polarization modulation to a received irradiance;
spatially Fourier transforming the image;
applying at least one spatial frequency domain filter to the Fourier transformed image;
applying an inverse spatial Fourier transform to the filtered Fourier transformed image; and
providing polarization image associated with at least one of a degree of linear polarization, a degree of circular polarization, an angle of polarization, a degree of polarization, a Stokes parameter $s_0$, a Stokes parameter $s_1$, a Stokes parameter $s_2$, or a Stokes parameter $s_3$ based on the inverse transform.

16. The method of claim 15, wherein the filter is a low pass filter and the polarization image is associated with the Stokes parameter $s_0$.

17. The method of claim 15, wherein the filter is a high pass filter, and the polarization image is associated with the Stokes parameter $s_1$ and the Stokes parameter $s_2$.

18. The method of claim 15, wherein the image is based on a periodic polarization analysis corresponding to a micropolarizer array having rows that alternate horizontal and 45 degree linear polarizers with rows that alternate −45 degree and vertical linear polarizers, and the polarization image is associated with a sum or a difference of the Stokes parameters $s_1$ and $s_2$.

19. The method of claim 18, wherein the received image is a two dimensional image, and the high pass filter is applied to spatial frequencies in two directions, and polarization images associated with the sum and difference of the Stokes parameters $s_1$ and $s_2$ are produced.

20. The method of claim 15, further comprising selecting at least one spatial frequency domain filter based on a spatial Fourier transform associated with the polarizer array.

21. The method of claim 20, wherein the spatial Fourier transform of the polarizer array is based on a periodic analyzer Stokes vector associated with the polarizer array.

* * * * *